US007199992B2

(12) United States Patent
Dyer et al.

(10) Patent No.: US 7,199,992 B2
(45) Date of Patent: Apr. 3, 2007

(54) ESD SHORTING BLOCK SYSTEM AND METHOD FOR COMPRESSION CONNECTOR-TYPE CABLES

(75) Inventors: William M. Dyer, San Jose, CA (US); Hoodin Hamidi, Walnut Creek, CA (US)

(73) Assignee: International Business Machines Corporation, Armonk, NY (US)

( * ) Notice: Subject to any disclaimer, the term of this patent is extended or adjusted under 35 U.S.C. 154(b) by 430 days.

(21) Appl. No.: 10/420,162

(22) Filed: Apr. 21, 2003

(65) Prior Publication Data

US 2004/0207964 A1    Oct. 21, 2004

(51) Int. Cl.
*H01H 47/00* (2006.01)
(52) U.S. Cl. .................... 361/220; 360/323
(58) Field of Classification Search ............ 360/264.2, 360/106, 323; 361/220, 56, 212
See application file for complete search history.

(56) References Cited

U.S. PATENT DOCUMENTS

| | | | | |
|---|---|---|---|---|
| 4,889,750 A | * | 12/1989 | Wiley | 428/34.2 |
| 5,214,562 A | * | 5/1993 | Levi | 361/212 |
| 5,644,454 A | | 7/1997 | Arya et al. | 360/106 |
| 5,686,697 A | * | 11/1997 | Miller et al. | 174/525 |
| 5,877,933 A | * | 3/1999 | Johansen et al. | 361/220 |
| 5,963,415 A | | 10/1999 | Johansen | 361/212 |
| 6,034,851 A | * | 3/2000 | Zarouri et al. | 360/137 |
| 6,351,352 B1 | * | 2/2002 | Khan et al. | 360/264.2 |
| 6,424,505 B1 | | 7/2002 | Lam et al. | 360/323 |
| 6,487,058 B1 | * | 11/2002 | Dykes | 361/56 |
| 6,507,467 B1 | | 1/2003 | Schadewald, Jr. et al. | 360/323 |
| 2002/0053590 A1 | | 5/2002 | Lennard et al. | 228/179.1 |
| 2002/0075610 A1 | * | 6/2002 | Schadewald et al. | 360/323 |
| 2002/0100607 A1 | | 8/2002 | Girard et al. | 174/250 |

* cited by examiner

*Primary Examiner*—Ronald Leja
(74) *Attorney, Agent, or Firm*—Zilka-Kotab, PC

(57) ABSTRACT

A system and associated method are disclosed for protecting a magnetoresistive (MR) head from damage caused by electrostatic discharge. Included is a protective member having a conductive surface for being removably positioned on a MR connector cable such that the conductive surface remains in electrical communication with contacts of the MR connector cable. Thus, the contacts are shorted to protect a MR head coupled to the MR connector cable from damage caused by electrostatic discharge. Further included is a clamp releasably coupled to the protective member for maintaining the conductive surface of the protective member in electrical communication with the contacts of the MR connector cable to facilitate the shorting of the contacts, thus ensuring the protection of the MR head coupled to the MR connector cable from the damage caused by the electrostatic discharge.

29 Claims, 7 Drawing Sheets

ESD SHORTING BLOCK SYSTEM AND METHOD FOR COMPRESSION CONNECTOR-TYPE CABLES

FIELD OF THE INVENTION

The present invention relates to magnetoresistive (MR) heads, and more particularly, this invention relates to protecting MR heads from electrostatic discharge (ESD).

BACKGROUND OF THE INVENTION

Presently known magnetoresistive (MR) heads include a write element for recording signals and a magnetoresistive (MR) sensor for reading the recorded signals. Compared to previous designs, current MR heads are up to 100 times more susceptible to damage during manufacture caused by electrostatic discharge (ESD). During manufacture, the drive elements including the MR head are open to the environment and subject to possible ESD from human handling. In contrast, during operation of the drive in a computer, the elements are encased in a protective cover with appropriate protections against ESD.

One prior approach to protection from ESD damage is described in U.S. Pat. No. 6,034,851 entitled "Shorting bar and test clip for protecting magnetic heads from damage caused by electrostatic discharge during manufacture." Such patent discloses a method and apparatus for selectively disabling a magnetic head to protect the head from damage caused by ESD during manufacture. The magnetic head is electrically attached to a flexure. The flexure has a set of test pads and a hinged portion that includes a shorting bar. The hinged portion of the flexure is folded to cause the shorting bar to short the test pads. The folded portion is secured with a clip which may be removed and replaced. A novel test clip is used with the flexure. The folded flexure is inserted into jaws of the test clip. The jaws clamp the folded flexure. The shorting bar shorts the sensor when the test clip is in a first position and removes the short when the test clip is moved to a second position.

Another prior approach to protection from ESD damage is described in U.S. Pat. No. 6,351,352 entitled "Separably bondable shunt for wireless suspensions." Such invention provides continuing shunt protection of wireless suspension assemblies with a shunt structure that is readily attached to and detached from the contact pads or other exposed areas of the conductive traces of the flexible conductive laminate portion of the wireless suspension for use as needed to protect the MR and GMR elements/heads. The shunt structure comprises a conductive web to connect the conductive traces in parallel, and adhesive allowing the separable attachment of the web to the traces. The metal or metal deposited conductive web has varying geometries of conductive areas and adhesive areas to allow conductive web attachment to the proximate contact pads of the suspension, to be removed during testing and left on during assembly and between tests to nearly continually protect the head magnetoresistive element, or, to provide continuous ESD protection for the MR and GMR element attached to a flexible conductive circuit, to allow conductive web attachment to the traces beyond the contact pads such that the web is left in place during suspension assembly, during testing and between tests.

Unfortunately, it is impractical or impossible to reuse the foregoing ESD-prevention designs. For example, the first design is integrally coupled to the MR connection cable, while the second design uses adhesive which may loose effectiveness. There is thus a need for an ESD-prevention design which may be re-used, as well as provide more effective protection from ESD damage in particular environments such as in use with a tape drive compression connector cable, for example.

DISCLOSURE OF THE INVENTION

A system and associated method are disclosed for protecting a magnetoresistive (MR) head from damage caused by electrostatic discharge. Included is a protective member having a conductive surface for being removably positioned on a MR connector cable such that the conductive surface remains in electrical communication with contacts of the MR connector cable. Thus, the contacts are shorted to protect a MR head coupled to the MR connector cable from damage caused by electrostatic discharge. Further included is a clamp releasably coupled to the protective member for maintaining the conductive surface of the protective member in electrical communication with the contacts of the MR connector cable to facilitate the shorting of the contacts, thus ensuring the protection of the MR head coupled to the MR connector cable from the damage caused by the electrostatic discharge.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Figure 1:
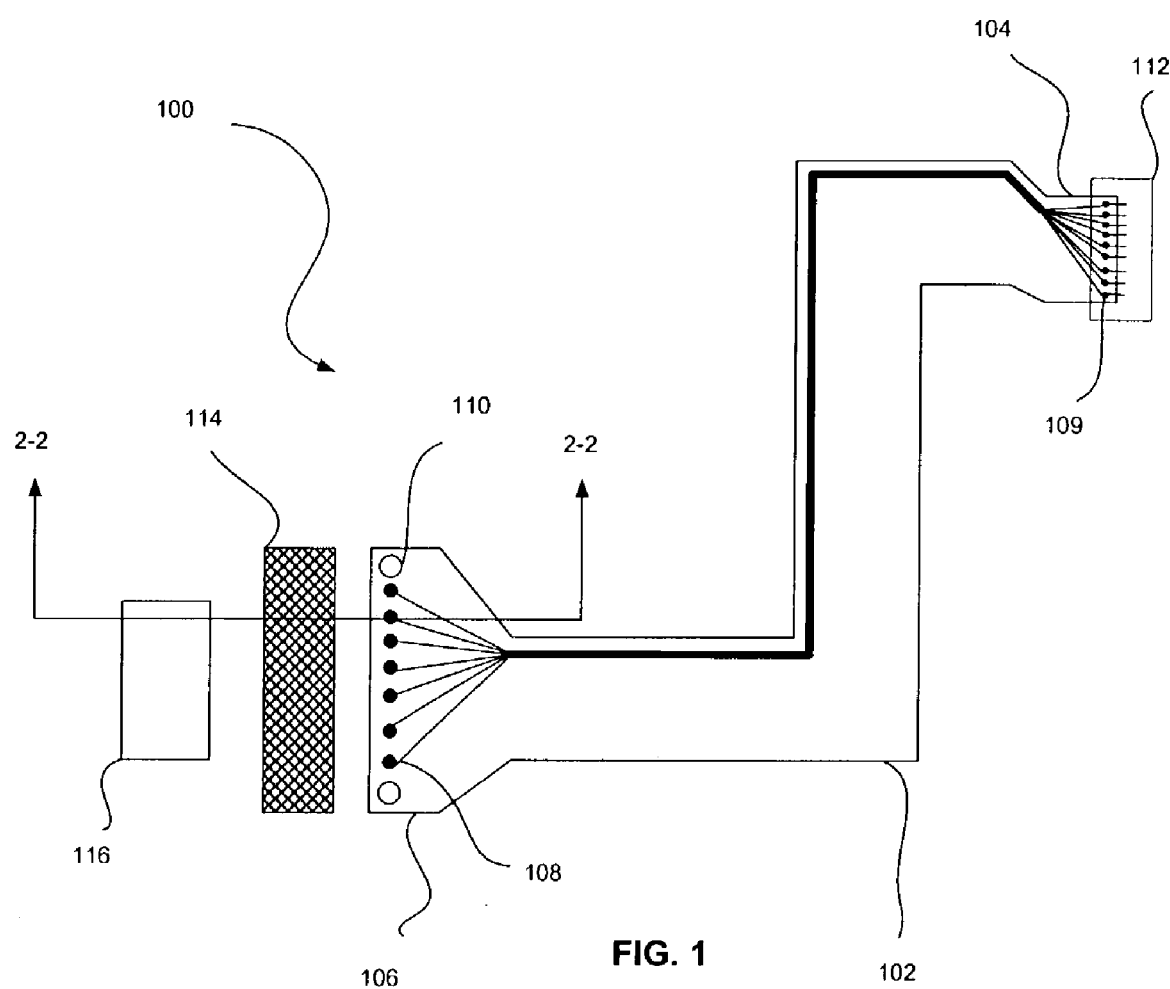
FIG. 1 illustrates a system for protecting a magnetoresistive (MR) head from damage caused by electrostatic discharge, in accordance with one embodiment.

FIG. 1 illustrates a system 100 for protecting a magnetoresistive (MR) head from damage caused by electrostatic discharge (ESD), in accordance with one embodiment. As shown, included is a MR connector cable 102 having a substantially planar configuration, and primarily constructed from a flexible plastic material. As shown in FIG. 1, the MR connector cable 102 includes a first end 104 and a second end 106. Both the first end 104 and second end 106 include a plurality of contacts 109 and 108, respectively.

Further provided is a MR head 112 coupled to the first end 104 of the MR connector cable 102 in electrical communication with the bonding contacts 109 thereof. As will soon become apparent, the second end 106 is adapted for being coupled to a control assembly in the form of a printed circuit board or the like for communicating control signals between the MR head 112 and the control assembly. To facilitate the coupling between the MR connector cable 102 and the control assembly, the MR connector cable 102 is equipped with a pair of spaced apertures 110 for engaging a pair of control assembly inserts (not shown).

In one embodiment, the MR connector cable 102 may include a tape drive compression cable or the like. In the context of the present description, however, the MR connector cable 102 may refer to any cable capable of communicating signals with the MR head 112 (which could be designed as a component of a tape or hard drive system).

Before the coupling between the MR connector cable 102 and the control assembly is carried out, the MR head 112 may be subjected to ESD exposure during the manufacture process, testing, and transportation process. Traditionally, such exposure to ESD is applied to the MR head 112 via the exposed contacts of the second end 106 of the MR connector cable 102 or to the exposed MR head 112 on the air bearing surface.

To protect the MR head 112 from damage associated with ESD in accordance with a first embodiment, a flexible conductive protective member 114 is provided. Further provided is a clamp 116 for clamping the protective member 114 to the exposed contacts 108 of the second end 106 of the MR connector cable 102 for shorting such contacts 108, thus protecting the MR head 112 from damage caused by ESD by creating an electrical path lower in resistance than the MR head 112. In use, the protective member 114 and the clamp 116 are capable of being re-used with a plurality of different MR connector cables 102.

Figure 2:
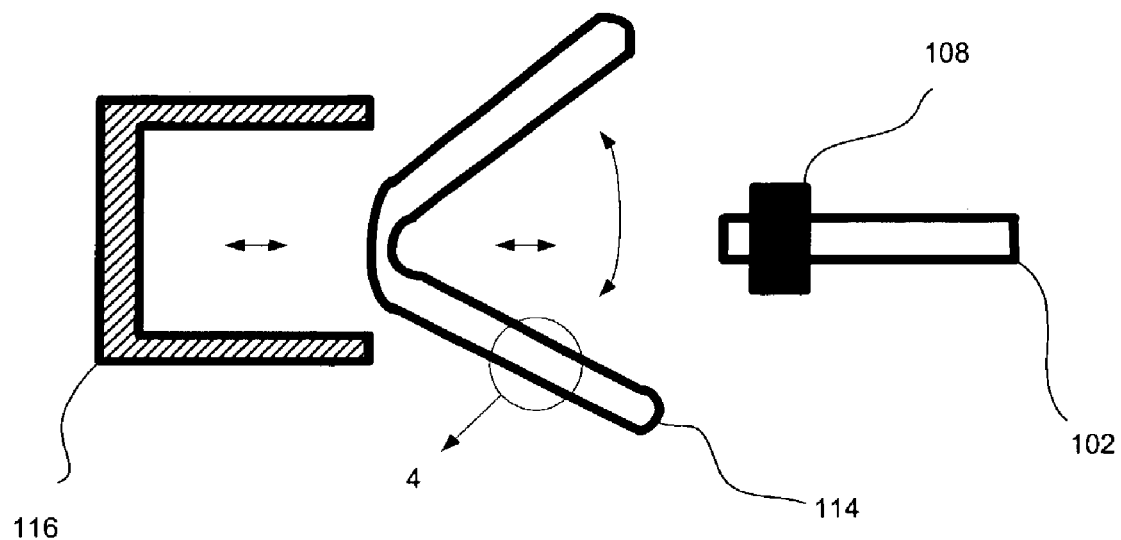
FIG. 2 illustrates an exploded side cross-sectional view of the various components of the system of FIG. 1, taken along line 2—2 of FIG. 1.

FIG. 2 illustrates an exploded side cross-sectional view of the various components of the system 100 of FIG. 1, taken along line 2—2 of FIG. 1. As shown, the protective member 114 may include a pair of substantially rectangular planar halves each including a pair of elongated edges and a pair of short edges. Moreover, a first one of the elongated edges of a first one of the halves may be hingably coupled to a first one of the elongated edges of a second one of the halves.

As an option, the hinged coupling may include an integral coupling, and the protective member 114 may be constructed from a substantially flexible material (i.e. elastomeric material, foam, etc.). Thus, in one embodiment, the protective member 114 includes a unitary device. Moreover, in the present embodiment, the protective member 114 may form a substantially V-shaped cross-section along a length thereof, and be capable of moving in a clamping motion represented by the arrows illustrated in FIG. 2.

For reasons that will soon become apparent, the protective member 114 may further include a conductive non-corrosive layer positioned thereon to form a conductive non-corrosive inner surface. More exemplary information regarding one possible construction of the protective member 114 will be set forth in greater detail during reference to FIG. 4.

Moreover, the clamp 116 may be formed of a substantially rigid material (i.e. plastic, etc.). Still yet, the clamp 116 may optionally be formed of a static dissipative or conductive material. In one embodiment, the clamp 116 may include a pair of substantially rectangular planar portions separated in a fixed spaced relationship with a substantially rectangular intermediate portion. Thus, the clamp 116 forms a substantially U-shaped cross-section along a length thereof.

Figure 3:
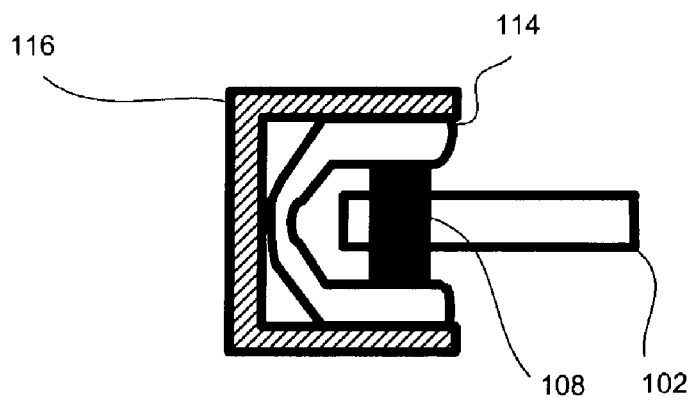
FIG. 3 illustrates another side cross-sectional view of the various components of FIG. 2, shown during operation.

FIG. 3 illustrates another side cross-sectional view of the various components of FIG. 2, shown during operation. As shown, the protective member 114 is capable of being clamped such that the conductive inner surface is engaged with the contacts 108 of the second end of the MR connector cable 102.

To this end, the halves of the protective member 114 are capable of receiving the second end 106 of the MR connector cable 102 such that the conductive inner surface thereof is in electrical communication with the contacts 108 of the MR connector cable 102. The protective member 114 thus functions to short the contacts 108 to protect the MR head 112 from damage caused by ESD.

Moreover, the clamp 116 is capable of being removably coupled to an outer surface of the protective member 114 to maintain the conductive inner surface thereof in electrical communication with the contacts 108 of the second end 106 of the MR connector cable 102.

Figure 4:
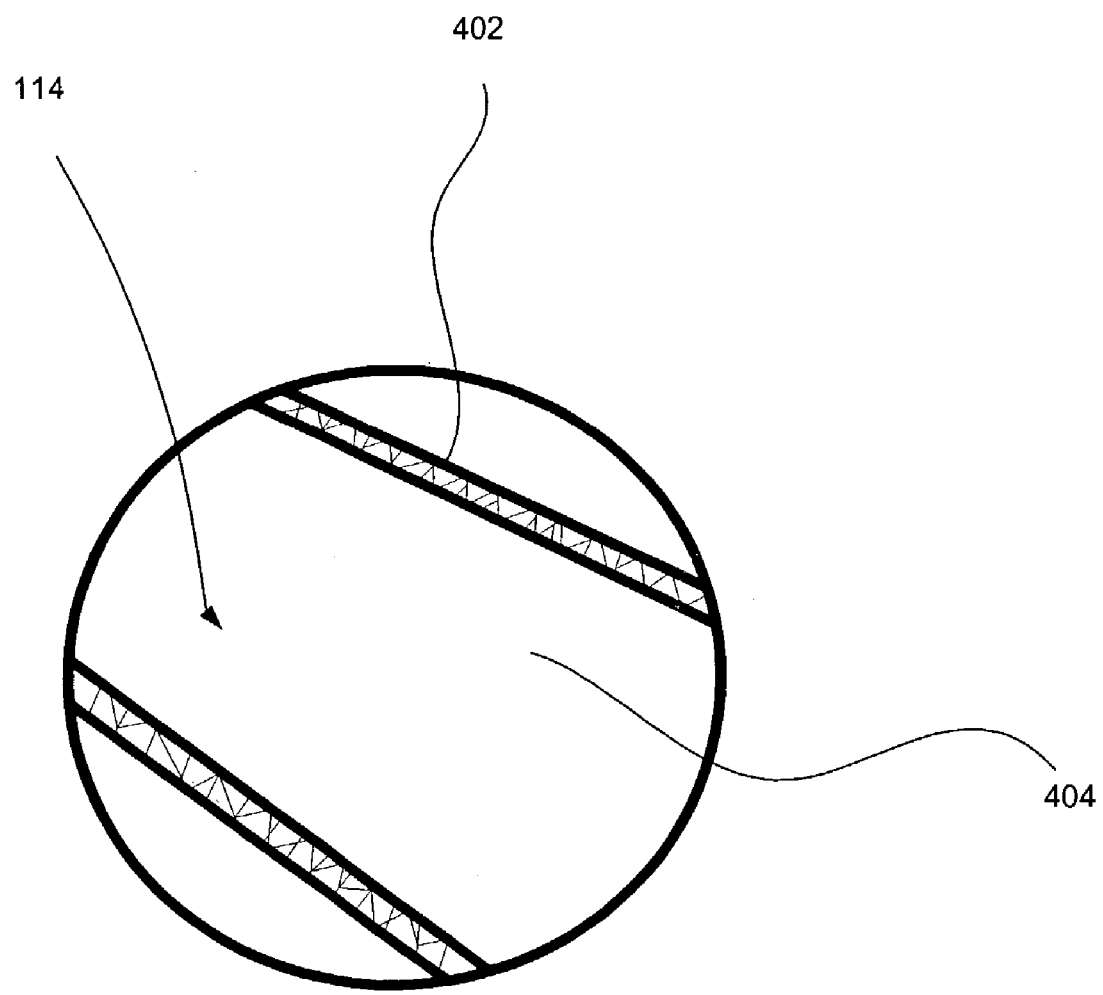
FIG. 4 illustrates an enlarged side cross-sectional view of the protective member encircled in area 4 shown in FIG. 2.

FIG. 4 illustrates an enlarged side cross-sectional view of the protective member 114 encircled in area 4 shown in FIG. 2. As shown, the protective member 114 may include a conductive layer 402 comprising a woven mesh of conductive fibers. In one embodiment, the conductive fibers may include copper or conductive stainless steel. Moreover, gold or some other non-corrosive material may be used in combination with the copper to prevent the layer 402 from corroding. Moreover, a center core 404 may be formed of a flexible material. As mentioned earlier, such core 404 may be formed of elastomeric material, foam, etc. In one embodiment, the core 404 may be formed of any static dissipative material or any other desired composition.

Figure 5:
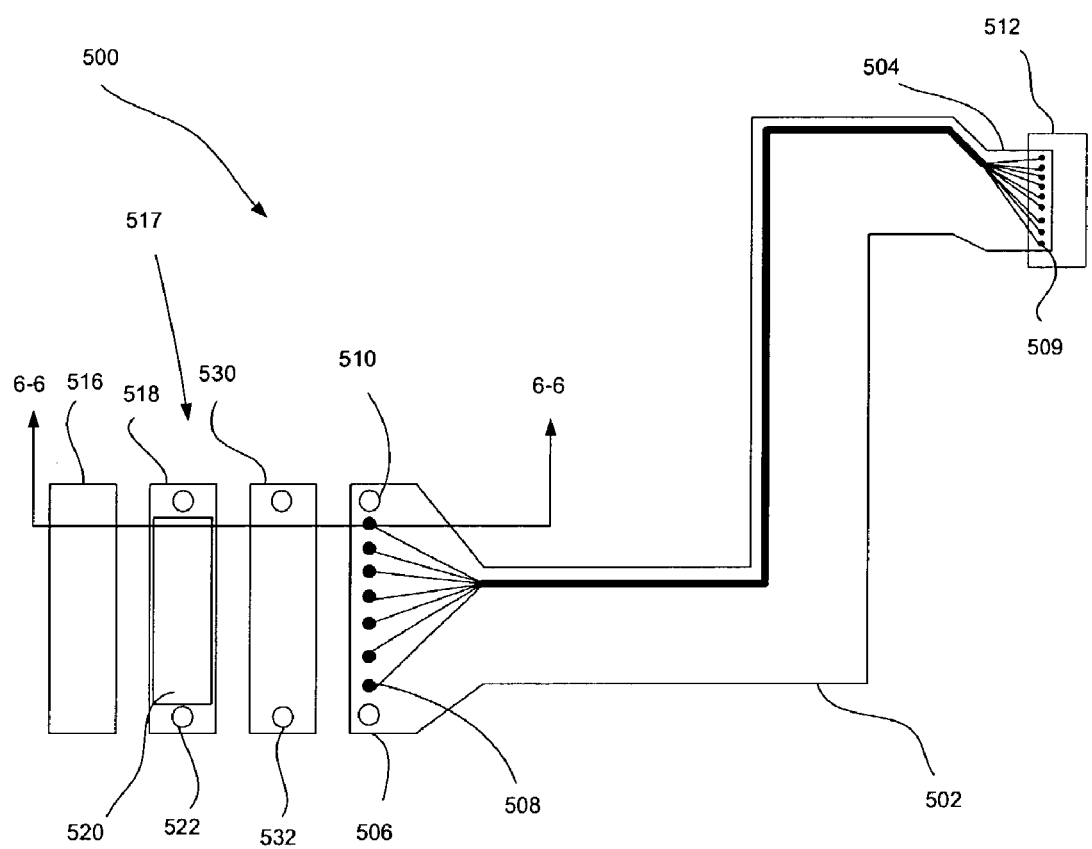
FIG. 5 illustrates a system for protecting a MR head from damage caused by electrostatic discharge, in accordance with another embodiment.

FIG. 5 illustrates a system 500 for protecting a magnetoresistive (MR) head from damage caused by ESD, in accordance with another embodiment. Similar to the embodiment of FIG. 1, included is a MR connector cable 502 having a substantially planar configuration, and primarily constructed from a flexible plastic material. As shown in FIG. 5, the MR connector cable 502 includes a first end 504 and a second end 506. Both the first end 504 and second end 506 include a plurality of contacts 509 and 508, respectively.

Further provided is a MR head 512 coupled to the first end 504 of the MR connector cable 502 in electrical communication with the bonding contacts 509 thereof. As will soon become apparent, the second end 506 is adapted for being coupled to a control assembly for communicating control signals between the MR head 512 and the control assembly.

In the present embodiment, a protective member 517 may include a substantially rectangular first portion 518 (i.e. a shorting block, etc.) having a top face with a pair of inserts 522 coupled thereto and extending therefrom. Such inserts 522 are adapted for being received into a pair of spaced apertures 510 formed in the MR connector cable 502, which are later used to facilitate the coupling of the MR connector cable 502 with the control assembly.

The first portion 518 of the protective member 517 is further equipped with a conductive surface 520 that may be situated between the inserts 522. As an option, the conductive surface 520 may include copper. Moreover, gold or any other non-corrosive material may be used in combination with the copper to prevent the conductive surface 520 from corroding.

Further associated with the protective member 517 is a substantially rectangular second portion 530 (i.e. a compression pad, etc.) having a pair of spaced holes 532 formed therein. Such holes 532 are suited for receiving the inserts 522 of the first portion 518, in a manner that will soon be set forth.

Similar to the embodiment of FIG. 1, the present embodiment is equipped with a clamp 516 for maintaining the conductive surface 520 of the first portion 518 of the protective member 517 in communication with the contacts 508 of the MR connector cable 502, as will soon be set forth in greater detail. It should be noted that both the clamp 516 and protective member 517 may be formed of a substantially rigid material (i.e. plastic, polymer, etc.). Still yet, such material may optionally be static dissipative.

Figure 6:
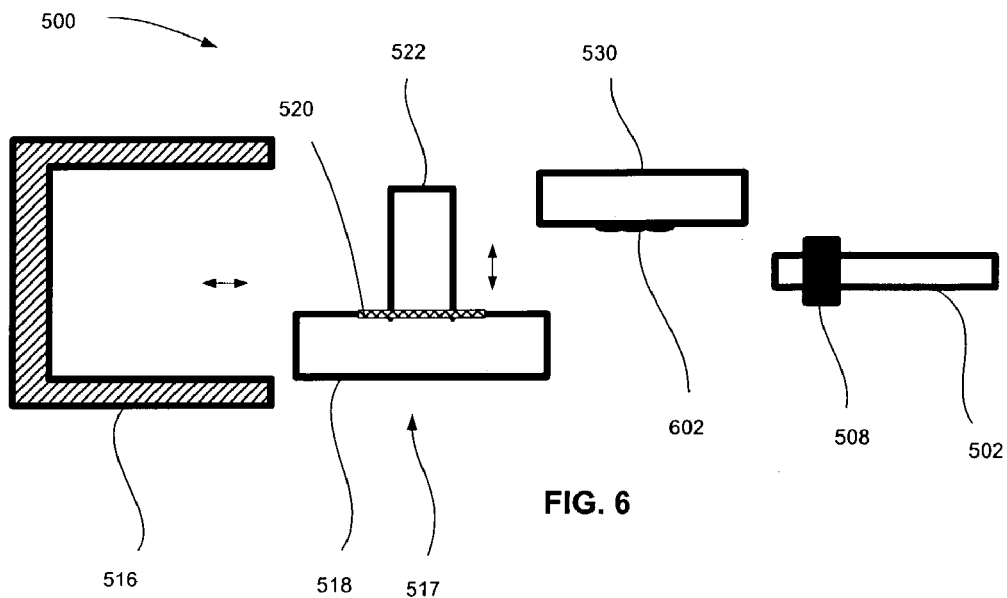
FIG. 6 illustrates an exploded side cross-sectional view of the various components of the system of FIG. 5, taken along line 6—6 of FIG. 5.

FIG. 6 illustrates an exploded side cross-sectional view of the various components of the system 500 of FIG. 5, taken along line 6—6 of FIG. 5. As shown, the second portion 530 of the protective member 517 may include a plurality of dimples 602 formed thereon for reasons that will soon be set forth. It should be noted that such dimples 602 may have a configuration similar to that of the contacts 508 of the MR connector cable 502.

In one embodiment, the clamp 116 may include a pair of substantially rectangular planar portions separated in a fixed spaced relationship with a substantially rectangular intermediate portion. Thus, the clamp 116 forms a substantially U-shaped cross-section along a length thereof.

Figure 7:
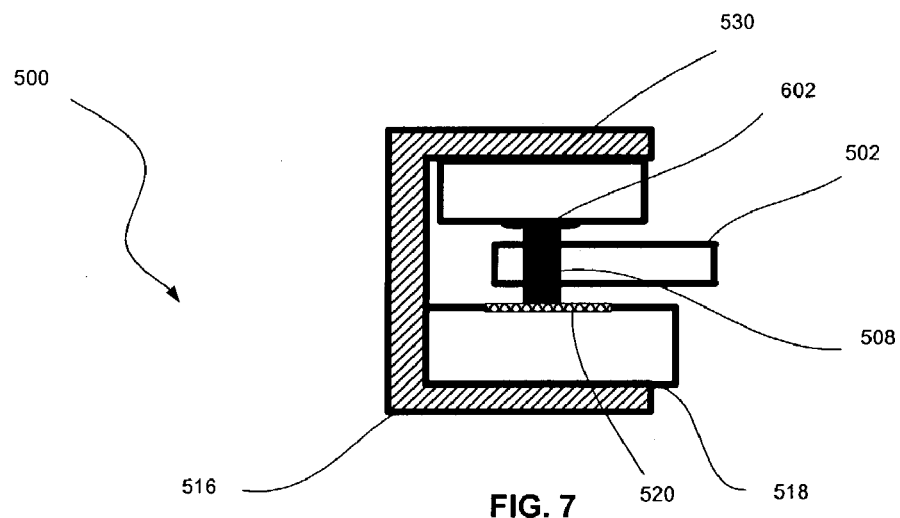
FIG. 7 illustrates another side cross-sectional view of the various components of FIG. 6, shown in an operative position.

FIG. 7 illustrates another side cross-sectional view of the various components of FIG. 6, shown in the operative position. As shown, the inserts 522 of the first portion 518 of the protective member 517 may be received in the apertures 510 of the MR connector cable 502. After the inserts 522 of the first portion 518 are received into the pair of spaced apertures 510 formed in the MR connector cable 502, the holes 532 of the second portion 530 of the protective member 517 may also receive the inserts 522 of the first portion 518.

The foregoing inserts 522, spaced apertures 510, and holes 532 work together to maintain the portions of the protective member 517 in alignment with the contacts 508 of the MR connector cable 502. Moreover, they maintain the dimples 602 of the second portion 530 of the protective member 517 in alignment with the contacts 508.

Upon the clamp 516 being releasably coupled to the protective member 517 in the manner shown in FIG. 7, the contacts 508 of the MR connector cable 502 may be forced in electrical communication with the conductive surface 520 of the first portion 518 of the protective member 517. Such electrical communication may be further facilitated by the dimples 602.

To this end, the protective member 517 functions to short the contacts 508 to protect the MR head 512 from damage caused by ESD. Again, similar to the embodiment of FIGS. 1–4, the protective member 517 and the clamp 516 are capable of being re-used with a plurality of different MR connector cables 502.

Figure 8:
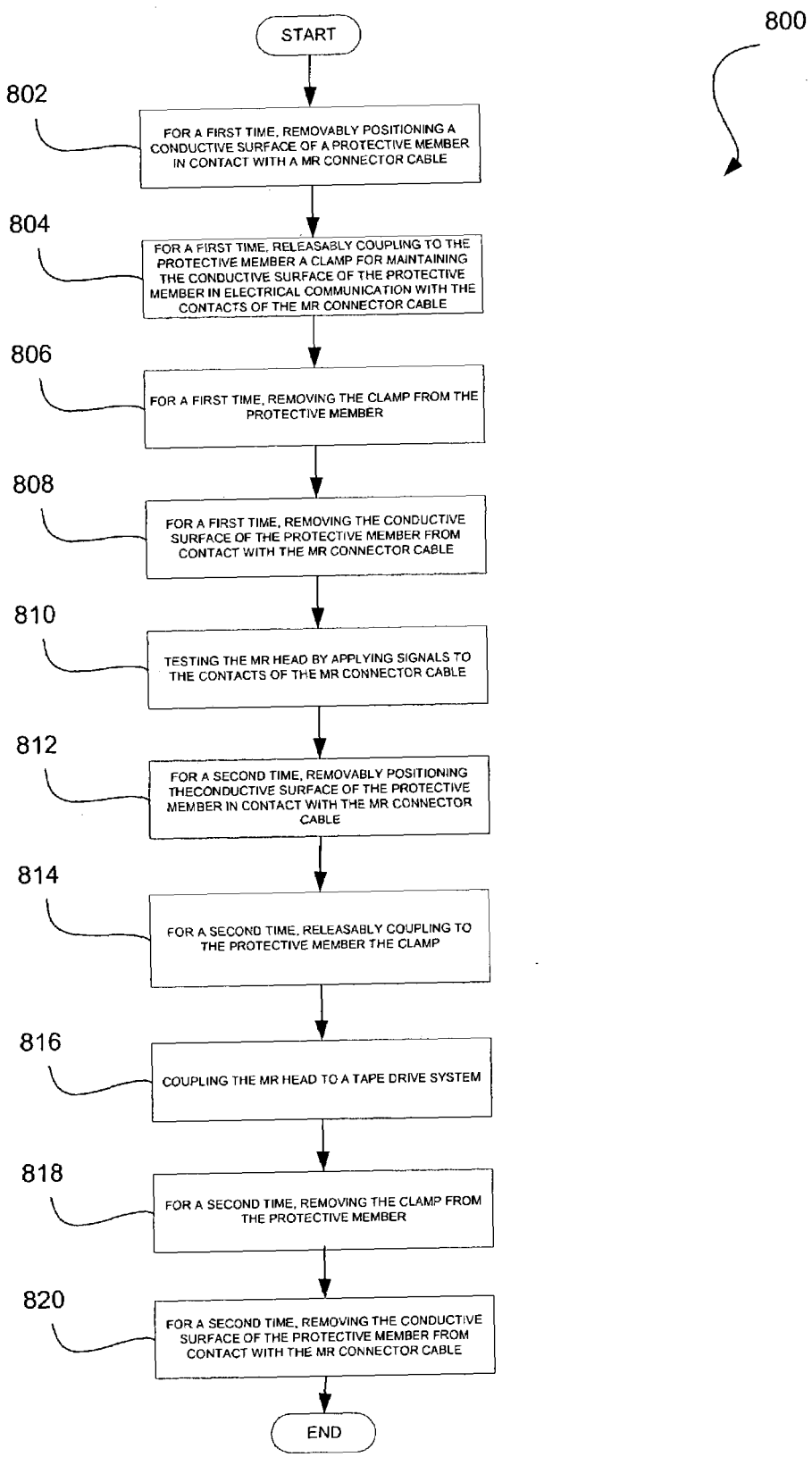
FIG. 8 illustrates a method for protecting a MR head from damage caused by electrostatic discharge.

FIG. 8 illustrates a method 800 for protecting a MR head from damage caused by ESD. As an option, the present method 800 may be implemented using any of the foregoing embodiments. Of course, the present method 800 may be implemented in any other desired context.

In operation 802, for a first time, a conductive surface of a protective member (see, for example, the embodiments described above) may be removably positioned in contact with a MR connector cable such that the conductive surface remains in electrical communication with contacts of the MR connector cable. Thus, the protective member may serve to protect a MR head coupled to the MR connector cable from damage caused by ESD.

Thereafter, for a first time, a clamp (see, for example, the embodiments described above) is releasably coupled to the protective member for maintaining the conductive surface of the protective member in electrical communication with the contacts of the MR connector cable. Note operation 804. The clamp thus serves to facilitate the shorting of the contacts to protect the MR head coupled to the MR connector cable from the damage caused by the ESD.

As an option, operations 802 and 804 may be performed prior to or immediately after the MR head is coupled to the MR connector cable, at which time the MR head is vulnerable to ESD damage during subsequent handling.

When one desires to test the MR head, the clamp may be removed from the protective member for a first time. See operation 806. Moreover, for a first time, the conductive surface of the protective member may be removed from contact with the MR connector cable, as indicated in operation 808. To this end, the MR head may be tested by applying signals to the contacts of the MR connector cable. See operation 810.

Then, for a second time, the conductive surface of the protective member may again be removably positioned in contact with the MR connector cable such that the conductive surface remains in electrical communication with contacts of the MR connector cable for shorting the contacts to protect the MR head coupled to the MR connector cable from damage caused by the ESD. See operation 812. Similarly, for a second time, the clamp may be releasably coupled to the protective member for maintaining the conductive surface of the protective member in electrical communication with the contacts of the MR connector cable, as indicated in operation 814.

While in the protected state, the MR head may be coupled to a tape drive system during a manufacturing process, in operation 816. More information regarding one exemplary tape drive system will be set forth in greater detail during reference to FIG. 9.

Since the MR head is protected from ESD when installed in the tape drive system, the clamp may be removed from the protective member, and the conductive surface of the protective member may be removed from contact with the MR connector cable, as indicated in operations 818 and 820. At this point, the protective member and clamp may be used with another MR head and connector cable during the course of subsequent iterations of operations 802–820.

Figure 9:
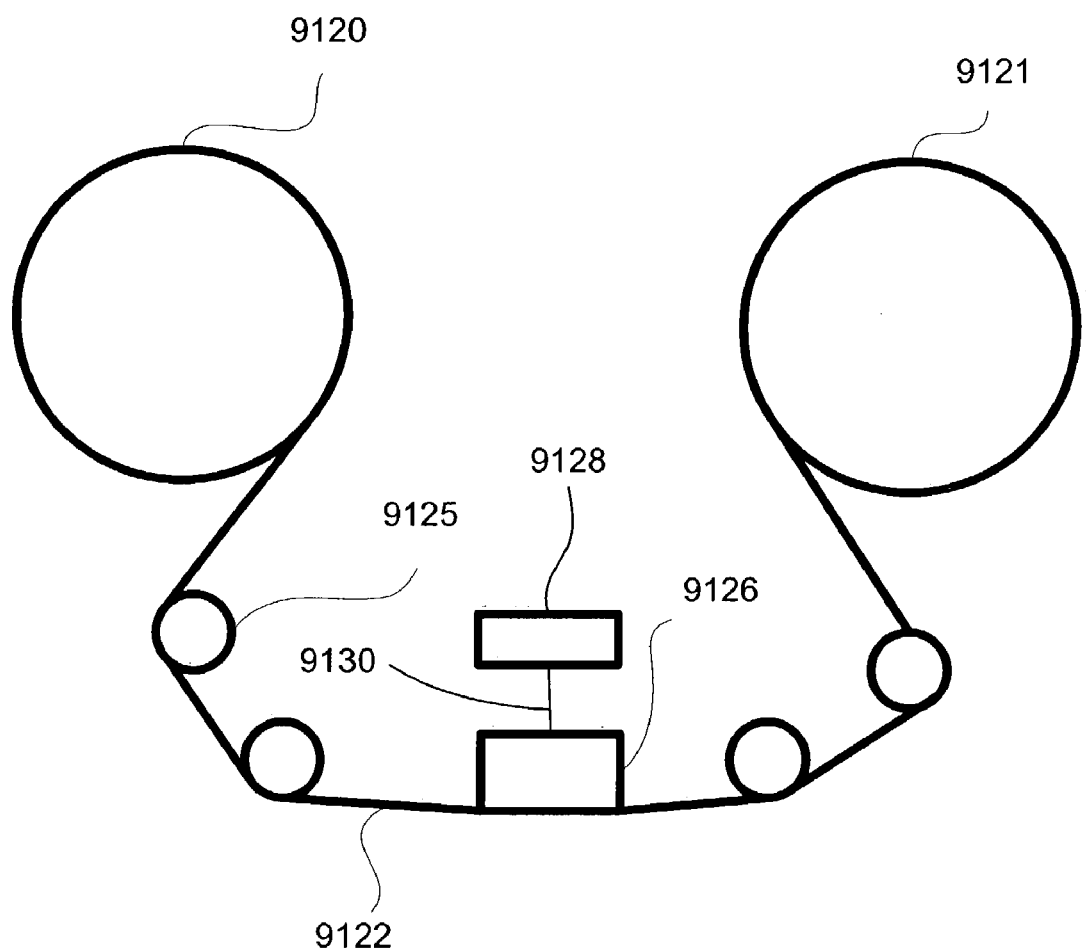
FIG. 9 illustrates a tape drive which may be employed in the context of the method of FIG. 8.

FIG. 9 illustrates a tape drive which may be employed in the context of the method 800 of FIG. 8. While one specific implementation of a tape drive is shown in FIG. 9, it should be noted that the embodiments of the previous figures may be implemented in the context of any type of drive (i.e. hard drive, tape drive, etc.)

As shown, a tape supply cartridge 9120 and a take-up reel 9121 are provided to support a tape 9122. Moreover, guides 9125 guide the tape 9122 across a bidirectional tape head 9126. Such bidirectional tape head 9126 is in turn coupled to a control assembly 9128 via a compression-type MR connector cable 9130.

A tape drive, such as that illustrated in FIG. 9, includes drive motor(s) to drive the tape supply cartridge 9120 and the take-up reel 9121 to move the tape 9122 linearly over the head 9126. The tape drive also includes a read/write channel to transmit data to the head 9126 to be recorded on the tape 9122 and to receive data read by the head 9126 from the tape 9122. An interface is also provided for communication between the tape drive and a host to send and receive the data and for controlling the operation of the tape drive and communicating the status of the tape drive to the host, all as understood by those of skill in the art.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system for protecting a magnetoresistive (MR) head from damage caused by electrostatic discharge, comprising:
a protective member having two portions adapted for sandwiching a MR connector cable therebetween, one of the portions including a conductive surface for being removably positioned on the MR connector cable such that the conductive surface is in electrical communication with contacts of the MR connector cable for shorting the contacts to protect a MR head coupled to the MR connector cable from damage caused by electrostatic discharge; and
a clamp releasably coupled to the protective member for maintaining the conductive surface of the protective member in electrical communication with the contacts of the MR connector cable to facilitate the shorting of the contacts to protect the MR head coupled to the MR connector cable from the damage caused by the electrostatic discharge.

2. The system as recited in claim 1, wherein the protective member is substantially flexible.

3. The system as recited in claim 1, wherein the protective member includes a pair of substantially rectangular planar halves each including a pair of elongated edges and a pair of short edges, with a first one of the elongated edges of a first one of the halves being hingably coupled to a first one of the elongated edges of a second one of the halves.

4. The system as recited in claim 3, wherein the hinged coupling is an integral coupling.

5. The system as recited in claim 3, wherein the protective member forms a substantially V-shaped cross-section along a length thereof.

6. The system as recited in claim 3, wherein the protective member is constructed with foam including a conductive layer positioned thereon.

7. The system as recited in claim 6, wherein the conductive layer includes a woven mesh of conductive fibers.

8. The system as recited in claim 1, wherein the protective member includes a substantially rectangular first portion having a top face with a pair of inserts coupled thereto and extending therefrom for being received into a pair of spaced apertures formed in the MR connector cable, and the conductive surface is situated between the inserts such that the conductive surface remains in electrical communication with contacts of the MR connector cable upon the inserts being received into the pair of spaced apertures formed in the MR connector cable.

9. The system as recited in claim 8, wherein the protective member further includes a substantially rectangular second portion having a pair of spaced holes formed therein for receiving the inserts of the first portion after the inserts of the first portion are received into the pair of spaced apertures formed in the MR connector cable, the second portion further including a plurality of dimples formed thereon for forcing the contacts of the MR connector cable in electrical communication with the conductive surface of the first portion of the protective member upon the clamp being releasably coupled thereto.

10. The system as recited in claim 1, wherein the clamp is substantially rigid.

11. The system as recited in claim 10, wherein the clamp includes a pair of substantially rectangular planar portions separated in a fixed spaced relationship with a substantially rectangular intermediate portion.

12. The system as recited in claim 10, wherein the clamp forms a substantially U-shaped cross-section along a length thereof.

13. The system as recited in claim 1, wherein the protective member and the clamp are capable of being re-used with a plurality of different MR connector cables.

14. The system as recited in claim 1, wherein the MR head is coupled to a linear tape drive.

15. A method for protecting a magnetoresistive (MR) head from damage caused by electrostatic discharge, comprising:
removably positioning two portions of protective member on a MR connector cable such that the two portions sandwich the MR connector cable therebetween, wherein one of the portions has a conductive surface in electrical communication with contacts of the MR connector cable for shorting the contacts to protect a MR head coupled to the MR connector cable from damage caused by electrostatic discharge;
releasably coupling to the protective member a clamp for maintaining the conductive surface of the protective member in electrical communication with the contacts of the MR connector cable to facilitate the shorting of the contacts to protect the MR head coupled to the MR connector cable from the damage caused by the electrostatic discharge.

16. The method as recited in claim 15, wherein the protective member is substantially flexible.

17. The method as recited in claim 15, wherein the protective member includes a pair of substantially rectangular planar halves each including a pair of elongated edges and a pair of short edges, with a first one of the elongated edges of a first one of the halves being hingably coupled to a first one of the elongated edges of a second one of the halves.

18. The method as recited in claim 17, wherein the hinged coupling is an integral coupling.

19. The method as recited in claim 17, wherein the protective member forms a substantially V-shaped cross-section along a length thereof.

20. The method as recited in claim 17, wherein the protective member is constructed with foam including a conductive layer positioned thereon.

21. The method as recited in claim 20, wherein the conductive layer includes a woven mesh of conductive fibers.

22. The method as recited in claim 15, wherein the protective member includes a substantially rectangular first portion having a top face with a pair of inserts coupled thereto and extending therefrom for being received into a pair of spaced apertures formed in the MR connector cable, and the conductive surface is situated between the inserts such that the conductive surface remains in electrical communication with contacts of the MR connector cable upon the inserts being received into the pair of spaced apertures formed in the MR connector cable.

23. The method as recited in claim 22, wherein the protective member further includes a substantially rectangular second portion having a pair of spaced holes formed therein for receiving the inserts of the first portion after the inserts of the first portion are received into the pair of spaced apertures formed in the MR connector cable, the second portion further including a plurality of dimples formed thereon for forcing the contacts of the MR connector cable in electrical communication with the conductive surface of the first portion of the protective member upon the clamp being releasably coupled thereto.

24. The method as recited in claim 15, wherein the clamp is substantially rigid.

25. The method as recited in claim 24, wherein the clamp includes a pair of substantially rectangular planar portions separated in a fixed spaced relationship with a substantially rectangular intermediate portion.

26. The method as recited in claim 24, wherein the clamp forms a substantially U-shaped cross-section along a length thereof.

27. An apparatus for protecting a magnetoresistive (MR) head from damage caused by electrostatic discharge, comprising:
   a protective member including a conductive surface for being removably positioned on a MR connector cable such that the conductive surface remains in electrical communication with contacts of the MR connector cable for shorting the contacts to protect a MR head coupled to the MR connector cable from damage caused by electrostatic discharge, wherein the protective member is not integral to the MR connector cable;
   wherein the MR connector cable includes a compression MR connector cable capable of being used with a tape drive.

28. A system for protecting a magnetoresistive (MR) head from damage caused by electrostatic discharge, comprising:
   a magnetoresistive (MR) connector cable having a substantially planar configuration including a first end and a second end each including a plurality of contacts;
   a MR head coupled to the first end of the MR connector cable in electrical communication with the contacts thereof;
   a substantially flexible protective member including a pair of substantially rectangular planar halves each including a pair of elongated edges and a pair of short edges, a first one of the elongated edges of a first one of the halves being integrally and hingably coupled to a first one of the elongated edges of a second one of the halves to form a substantially V-shaped cross-section along a length thereof, the protective member including a conductive non-corrosive inner surface;
   a substantially rigid clamp including a pair of substantially rectangular planar portions separated in a fixed spaced relationship with a substantially rectangular intermediate portion to form a substantially U-shaped cross-section along a length thereof;
   wherein the halves of the protective member are capable of receiving the second end of the MR connector cable such that the conductive non-corrosive inner surface thereof is in electrical communication with the contacts for shorting the contacts to protect the MR head from damage caused by electrostatic discharge, and the clamp is capable of being removably coupled to an outer surface of the protective member to maintain the conductive non-corrosive inner surface thereof is in electrical communication with the contacts of the second end of the MR connector cable.

29. A method for protecting a magnetoresistive (MR) head from damage caused by electrostatic discharge, comprising:
   for a first time, removably positioning two portions of protective member on a MR connector cable such that the two portions sandwich the MR connector cable therebetween, wherein one of the portions has a conductive surface in electrical communication with contacts of the MR connector cable for shorting the contacts to protect a MR head coupled to the MR connector cable from damage caused by electrostatic discharge;
   for a first time, releasably coupling to the protective member a clamp for maintaining the conductive surface of the protective member in electrical communication with the contacts of the MR connector cable to facilitate the shorting of the contacts to protect the MR head coupled to the MR connector cable from the damage caused by the electrostatic discharge;
   for a first time, removing the clamp from the protective member;
   for a first time, removing the conductive surface of the protective member from contact with the MR connector cable;
   testing the MR head by applying signals to the contacts of the MR connector cable;
   for a second time, removably positioning the conductive surface of the protective member in contact with the MR connector cable such that the conductive surface remains in electrical communication with contacts of the MR connector cable for shorting the contacts to protect the MR head coupled to the MR connector cable from damage caused by the electrostatic discharge;
   for a second time, releasably coupling to the protective member the clamp for maintaining the conductive surface of the protective member in electrical communication with the contacts of the MR connector cable to facilitate the shorting of the contacts to protect the MR head coupled to the MR connector cable from the damage caused by the electrostatic discharge;
   coupling the MR head to a tape drive system capable of moving a magnetic recording tape linearly and bidirectionally;
   for a second time, removing the clamp from the protective member; and
   for a second time, removing the conductive surface of the protective member from contact with the MR connector cable.

* * * * *